United States Patent [19]

Samuel

[11] Patent Number: 4,675,695

[45] Date of Patent: Jun. 23, 1987

[54] METHOD AND APPARATUS FOR TEMPERATURE CONTROL IN THERMAL PRINTERS

[75] Inventor: Robert A. Samuel, Snohomish, Wash.

[73] Assignee: Intermec Corporation, Lynnwood, Wash.

[21] Appl. No.: 808,497

[22] Filed: Dec. 13, 1985

[51] Int. Cl.[4] ........................ G01D 9/00; G01D 15/10

[52] U.S. Cl. ................................ 346/1.1; 346/76 PH

[58] Field of Search ............................ 346/1.1, 76 PH

[56] References Cited

U.S. PATENT DOCUMENTS

| | | | |
|---|---|---|---|
| 3,710,913 | 1/1973 | Brennan, Jr. et al. | 400/120 |
| 4,415,904 | 11/1983 | Invi et al. | 346/1.1 |
| 4,568,817 | 2/1986 | Leng et al. | 219/216 X |

*Primary Examiner*—E. A. Goldberg
*Assistant Examiner*—Gerald E. Preston
*Attorney, Agent, or Firm*—Christensen, O'Connor, Johnson & Kindness

[57] ABSTRACT

A thermal printing apparatus for printing on a thermal print medium (10) having a conversion temperature ($T_C$) to which the thermal print medium must be raised to cause printing to occur. The apparatus comprises a thermal print element (40) and exposure means for providing energy to the print element at a first average rate for a time sufficient to raise the temperature of the print element from below the conversion temperature to a temperature above the conversion temperature, and for then providing energy to the print element at a second average rate, the second average rate being less than the first average rate but sufficient to maintain the temperature of the print element above the conversion temperature. The exposure means comprises print enable means (100) for generating an enable signal defining the total length of the energizing interval, modulation means (102) responsive to the enable signal for generating a strobe signal comprising a first pulse (84) followed by a series of second pulses (86), and driver means (50) for energizing the print element in response to the strobe signal pulses. The first pulse has a first pulse length sufficient to raise the temperature of the print element above the conversion temperature. Each second pulse has a second pulse length less than the first pulse length, and the series of second pulses have a duty cycle selected to maintain the temperature of the print element above the conversion temperature.

6 Claims, 11 Drawing Figures

LINE 104

LINE 138

LINE 140

LINE 142

LINE 56

METHOD AND APPARATUS FOR TEMPERATURE CONTROL IN THERMAL PRINTERS

FIELD OF THE INVENTION

The present invention relates to thermal printers and, in particular, to thermal printers having improved temperature contol means.

BACKGROUND OF THE INVENTION

A thermal printer is a device capable of printing characters, bar codes or other marks on a thermal print medium. Printing is accomplished by raising the temperature of the thermal print medium above a threshold or conversion temperature, whereupon a coating on the thermal print medium undergoes a chemical change and changes color. Typically, the temperature of the thermal print medium is raised by the use of a thermal print head that includes one or more resistive print elements that are mounted on a ceramic substrate and that are maintained in contact with the thermal print medium. The configuration of each print element defines a portion of a character, or an entire character, to be printed.

It is important that a thermal printer be capable of precisely controlling the amount of heat applied to print each character portion. Control of the amount of heat applied to the thermal print medium is achieved, in part, by controlling the exposure time, i.e., the time during which the thermal print medium is held above the conversion temperature. An effective technique for controlling exposure time is described in U.S. Pat. No. 4,391,535. In the technique described therein, a driver circuit provides energy to the print element in response to a strobe signal. An analog circuit is used to model the flow of heat between the print element and its environment, and to produce a voltage signal having a level that corresponds to the estimated temperature of the print element. The voltage signal is monitored by a control circuit, and used to determine the duration of the strobe signal, to thereby control the exposure time.

SUMMARY OF THE INVENTION

The operating life of a thermal print element is the average number of hours that the print element operates before failure, such failure typically comprising an open circuit or a short circuit at the print element. The present invention is based upon the discovery that for many applications, the operating life of a print element can be substantially increased by modulating the strobe signal, such that the energy is initally provided to the print element at a first, comparatively high rate to raise the temperature of the print element above the conversion temperature, and is then provided at a second rate that is lower than the first rate, but high enough to maintain the print element temperature above the conversion temperature. The result of this technique is that the print element is energized in a manner that is optimized for print quality and longevity of the print element.

In one aspect, the present invention provides a thermal printing apparatus for printing on a thermal print medium having a conversion temperature to which the thermal print medium must be raised to cause printing to occur. The thermal printing apparatus comprises a thermal print element, and exposure means for providing energy to the print element. The exposure means provide such energy at a first average rate for a time sufficient to raise the temperature of the print element from below the conversion temperature to a temperature above the conversion temperature, and then provides energy at a second average rate that is less than the first average rate but nevertheless sufficient to maintain the temperature of the print element above the conversion temperature. The exposure means may comprise drive means operative to provide energy to the thermal print element in response to a strobe signal, and control means for generating the strobe signal. In a prefered embodiment, the strobe signal comprises a first pulse followed by a series of second pulses. The first pulse has a first pulse length sufficient to raise the temperature of the print element above the conversion temperature. Each second pulse has a length shorter than the first pulse length, and the series of second pulses has a duty cycle selected to maintain the temperature of the print element above the conversion temperature.

In a second aspect, the present invention provides a method for thermal printing on a thermal print medium having a conversion temperature to which the thermal print medium must be raised to cause printing to occur. The method comprises contacting the thermal print medium with a thermal print element, providing energy to the print element at a first average rate, and then providing energy to the print element at a second average rate that is lower than the first average rate. Energy is provided at the first average rate for a time sufficient to raise the temperature of the print element from below the conversion temperature to a temperature above the conversion temperature. The second average rate is sufficient to maintain the temperature of the print element above the conversion temperature.

DETAILED DESCRIPTION OF THE INVENTION

Figure 1:
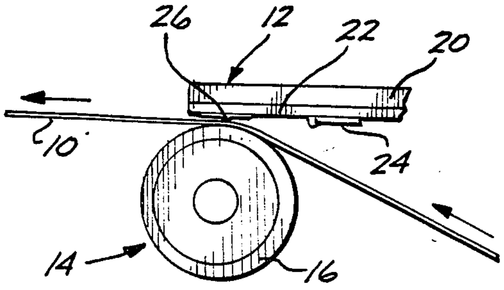
FIG. 1 is a schematic view of a portion of a thermal printer.

The present invention provides an improved technique for providing energy to the thermal print elements of a thermal printer. A typical direct thermal printing arrangement is illustrated in partial schematic form in FIG. 1. Thermal print medium 10, such as a conventional thermal paper, is caused to move past thermal print head 12 by the rotary motion of drive roller 14. The outer surface of the drive roller includes resilient covering 16 that provides frictional engagement between the drive roller and the thermal print medium. Print head 12 includes metal plate 20, ceramic substrate 22, circuit means 24 and a linear array 26 (perpendicular to the plane of FIG. 1) of thermal print elements. The present invention is also applicable to transfer thermal printing arrangements in which the thermal print medium that passes between the print head and drive roller comprises a transfer film together with a receiver medium such as receiver paper. With respect to transfer printing, references herein to the temperature of the thermal print medium should be understood as referring to the temperature of the transfer film.

In operation, drive roller 14 is energized to advance thermal print medium 10 an incremental distance with respect to the thermal print elements, in the direction indicated by the arrows. Selected thermal print elements are then energized to expose selected areas of the thermal print medium. When sufficient energy has been provided to the thermal print medium, the thermal print elements are de-energized, and a thermal printing apparatus then waits for a period of time sufficient to permit the temperature of the thermal print medium to fall below the conversion temperature of the thermal print medium. Drive roller 14 is then actuated to advance the thermal print medium another incremental distance to the next print position, and the above process is repeated.

Figure 2:
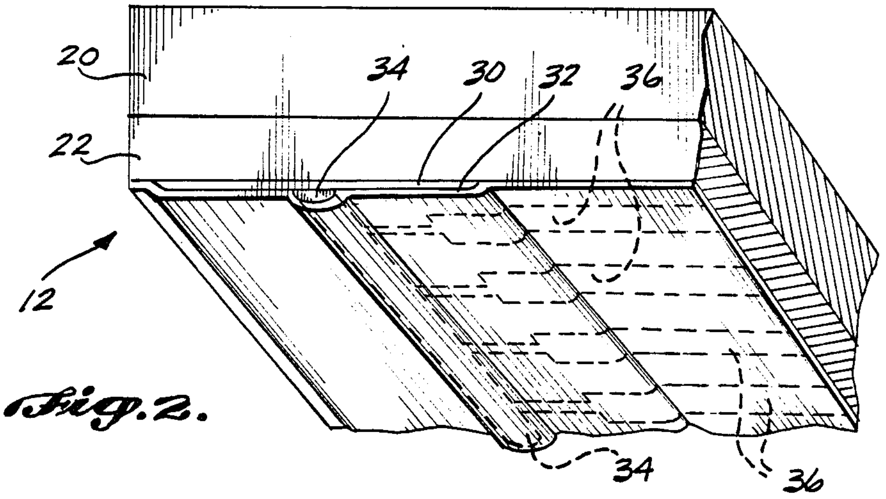
FIG. 2 is a perspective view of a portion of a thermal print head.

The structure of print head 12 is illustrated in greater detail in FIG. 2. In addition to plate 20 and substrate 22, described above, the print head comprises undercoat 30, overcoat 32, heating element 34, and electrical leads 36. Undercoat 30 is a layer of glazed material such as glass and is bonded directly to substrate 22. Heating element 34 has a semi-elliptical cross section, and is mounted directly to undercoat 30. Leads 36 are deposited on the lower surface of the substrate 22 and undercoat 30, and make electrical connections from circuit means 24 (FIG. 1) to heating element 34 at spaced-apart positions along the length of the heating element. Overlying the substrate, undercoat, heating element and leads is overcoat layer 32 that comprises a glass layer approximately 10 microns thick. Selective energizing of the leads 36 causes specific segments of heating element 34 to pass electrical current, thereby heating these segments and exposing the thermal print medium in contact with these segments. The segments of heating element 34 that may be selectively and individually energized are referred to herein as print elements.

Figure 3:
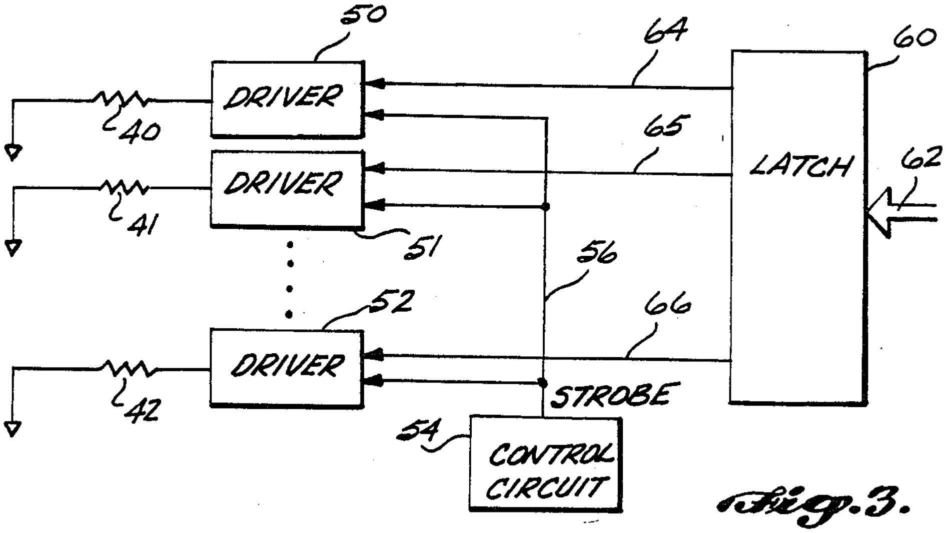
FIG. 3 is a block diagram of a circuit for energizing the print elements.

A suitable control circuit for energizing the thermal print elements is illustrated in FIG. 3. Although FIG. 3 illustrates three thermal print elements 40–42, it is to be understood that the number of print elements may range from one, for example in a thermal printer adapted to print bar codes comprising bars extending laterally across the thermal print medium, to well over a hundred in a thermal printer for printing letters, numbers and other characters. The circuit for providing energy to print elements 40–42 comprises drivers 50–52, control circuit 54 and latch 60. Drivers 50–52 are connected to selectively provide energy to print elements 40–42 respectively. Data representing the pattern to be written across the width of the thermal print medium at a given position is generated by a suitable controller, and stored in latch 60 via bus 62. The individual 1 bit memory elements in latch 60 are connected to drivers 50–52 via lines 64–66 respectively. Each driver is also connected to receive a strobe signal from control circuit 54 via line 56. Each driver energizes its associated print element when both the strobe signal and the data signal from the associated latch memory element are present.

Figure 4:
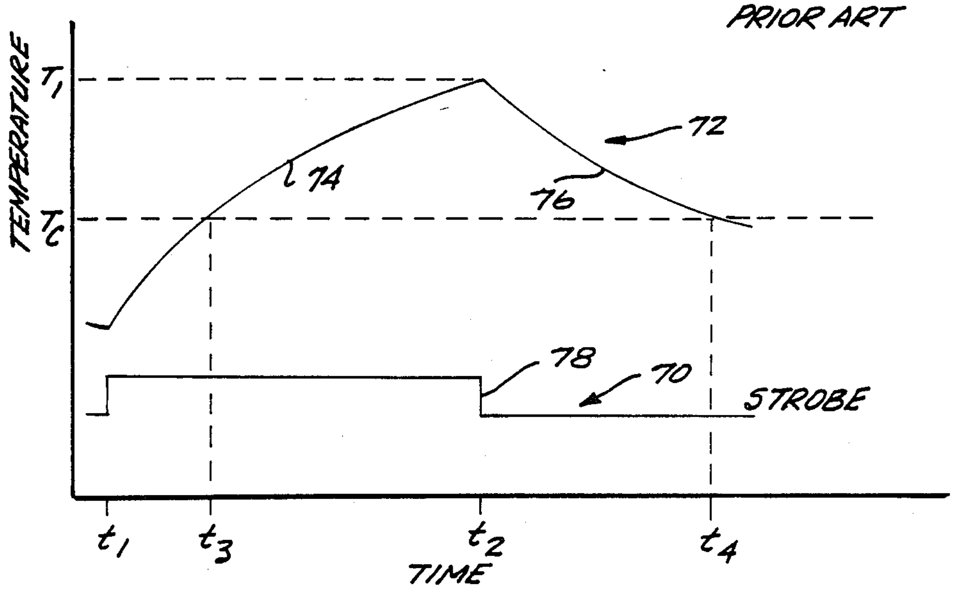
Fig. 4. PRIOR ART
FIG. 4 is a graph showing the strobe signal and print element temperature of a prior art system.

A prior art example of control circuit 54 is illustrated in U.S. Pat. No. 4,391,535 which patent is assigned to the assignee of the present application and is incorporated herein by reference. The operation of such a prior art system is illustrated in FIG. 4. In FIG. 4, curve 70 represents the strobe signal on line 56 that is input to each driver. Curve 72 illustrates the temperature of one of the print elements in response to the strobe signal, assuming that the data signal is present for the corresponding driver. The strobe signal comprises a single pulse 78 that begins at time $t_1$ and ends at time $t_2$. During time interval from $t_1$ to $t_2$, the temperature of the print element rises exponentionally, as illustrated by curve portion 74. Beginning at time $t_2$, the temperature of the print element decreases exponentionally, as indicated by curve portion 76. Time $t_2$ is determined as the time when the print element temperature, as represented by curve 72, reaches the temperature $T_1$. Of necessity, temperature $T_1$ must be substantially above the conversion temperature $T_C$ of the thermal print medium, because of the requirement that the print element temperature remain above the conversion temperature for a prescribed period of time. In FIG. 4, the print element temperature is above the conversion temperature for an exposure time extending from time $t_3$ to $t_4$. One result of this arrangement is that the print element temperature rises substantially above the conversion temperature, by an amount up to $T_1-T_C$, during the exposure time.

In accordance with the present invention, it has been discovered that the excess temperature represented by $T_1-T_C$ in FIG. 4 is associated with the operating life of print heads for thermal printers. In particular, it has been discovered that the premature appearance of damage in overcoat 32, heating element 34 and undercoat 30 (FIG. 2) is correlated to the degree to which the print element temperature exceeds the conversion temperature during the exposure time. Therefore, to increase print head life, the present invention provides energy to each print element at two average rates. Initially, energy is provided at a first, higher average rate, until the temperature of the print element exceeds the conversion temperature. Energy is then provided to the print element at a lower, second average rate, until a sufficient time interval has elapsed. Application of energy is then stopped, allowing the print element to cool below the conversion temperature.

Figure 5:
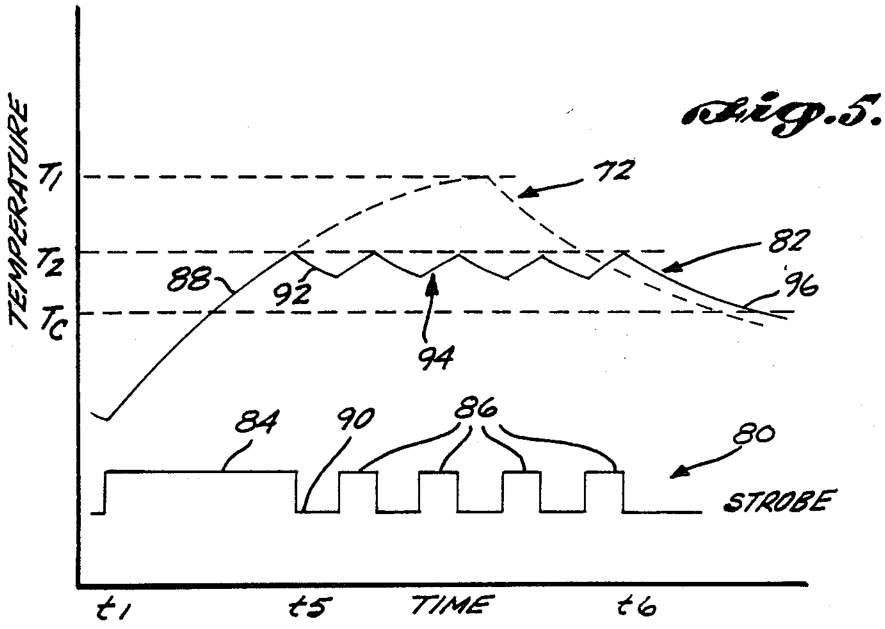
FIG. 5 is a graph showing the stobe signal and print head temperature using the technique of the present invention.

The technique of the present invention is illustrated in FIG. 5. In FIG. 5, curve 80 represents the strobe signal on line 56 at its input to each driver, and curve 82 represents the temperature of the associated print element in response to the strobe signal, assuming that the data signal is present for the corresponding driver. The strobe signal comprises a single pulse 84 that begins at time $t_1$ and ends at time $t_5$, followed by a series of shorter pulses 86 that extends from time $t_5$ to time $t_6$. During the time interval from $t_1$ to $t_5$, the print element temperature rises exponentially to temperature $T_2$ that is above the conversion temperature $T_C$, as indicated by curve portion 88. The strobe signal then goes low, at 90, whereupon the print element temperature begins to drop exponentially, as indicated by curve portion 92. The subsequent short pulses 86 of the strobe signal between times $t_5$ and $t_6$ subsequently cause the print element temperature to vary as indicated by curve portion 94. After time $t_6$, the strobe signal terminates, and the print element temperature drops exponentially, as indicated by curve portion 96, to below the conversion temperature.

The average rate at which energy is provided to the print element in the time interval from $t_5$ to $t_6$ depends upon the duty cycle of the strobe signal during such time interval. This duty cycle is preferably selected such that the print element temperature remains above $T_C$, but does not substantially exceed $T_C$, during such time interval. In the example of FIG. 5, the duty cycle is selected such that the print element temperature does not exceed $T_2$. Therefore in comparison to curve 72 of FIG. 4, shown in phantom in FIG. 5, the maximum temperature of the print element has been reduced by an amount equal to $T_1$–$T_2$. It has been found that such a temperature reduction substantially increases the operating life of certain print heads for thermal printers.

Figure 6:
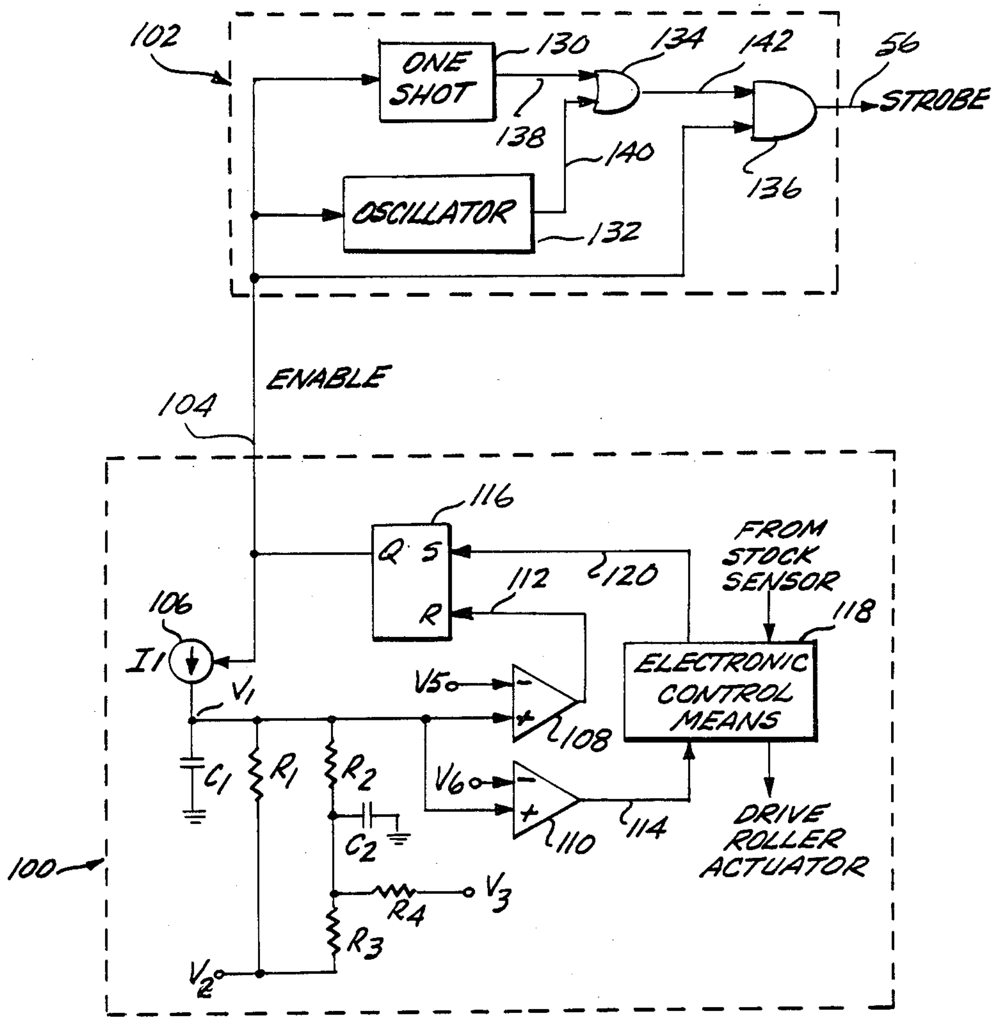
FIG. 6 is a circuit diagram of the control circuit for the print element driver.

A control circuit for generating the strobe signal shown in FIG. 5 is illustrated in FIG. 6. The control circuit in FIG. 6 includes print enable circuit 100 and modulator circuit 102. Print enable circuit 100 is essentially identical to the corresponding circuit shown and described in U.S. Pat. No. 4,391,535. Briefly, print enable circuit 100 operates to generate an enable signal on line 104 having a particular duration, such duration corresponding to the time interval $t_1$ through $t_6$ of FIG. 5. While the enable signal on line 104 is present, current source 106 provides a constant current I1 to a modeling circuit that comprises capacitors C1 and C2, and resistors R1, R2, R3 and R4. Current I1 represents the power delivered to the print elements. Capacitors C1 and C2 represent the thermal mass of the print element and substrate respectively. Resistors R1–R4 represent various heat transfer characteristics, as described in U.S. Pat. No. 4,391,535. Resistors R1 and R3 are tied to voltage V2 that represents the measured air temperature, and that may be estimated or determined by a suitable temperature sensor. Resistor R4 is tied to voltage V3 that represents the estimated or sensed temperture of plate 20.

Figure 7A:
FIG. 7 is an electrical signal diagram for the circuit of FIG. 6.

As described in the above-mentioned patent, when the enable signal on line 104 turns current source 106 on, the current source provides constant current I1 to the modeling circuit, whereupon voltage V1 begins to rise. Voltage V1 is supplied to the noninverting inputs of comparators 108 and 110. A voltage V5 that is related to the conversion temperature of the thermal print medium is applied to the inverting input of comparator 108, and a voltage V6 that represents an empirically determined temperature below the conversion temperature is appled to the inverting input of comparator 110. The output signal from comparator 108 is applied to a reset (R) input of flip-flop 116 via line 112, and a print signal from an electronic control means 118 of the thermal printer is applied to a set (S) input of flip-flop 116 via line 120. The output signal from comparator 110 is applied to electronic control means 118 via line 114, which control means also receives a control signal from a stock sensor and provides a control signal to actuate drive roller 14. The signal appearing on the Q output of flip-flop 116 is the enable signal on line 104. This signal is illustrated in FIG. 7A, and defines the energizing interval, i.e., the time period from $t_1$ to $t_6$ (FIG. 5) during which energy may be provided to the print elements.

In operation, electronic control means 118 is responsive, in part, to the control signal from the stock sensor to supply a control signal to actuate the drive roller until the thermal print medium has advanced a prescribed incremental distance. When the thermal print medium has been properly positioned, the electronic control means causes the print signal on line 120 to go high, whereby flip-flop 116 is set, causing the enable signal to go high. The setting of flip-flop 116 corresponds to time $t_1$ in FIGS. 5 and 7A. When the enable signal goes high, current source 106 is turned on, and the voltage V1 increases in an exponential manner as determined by the values of the components of the modeling circuit. When the voltage V1 exceeds the value of voltage V5, the output signal from comparator 108 goes high, resetting flip-flop 116 and causing the enable signal to go low at time $t_6$. Voltage V1 thereupon decreases until it is less than voltage V6, whereupon the output of comparator 110 goes low, signalling the electronic control means that the thermal print medium can be advanced to the next incremental printing position.

Figure 7B:
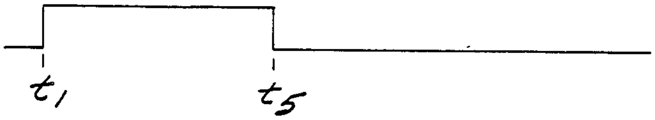
Figure 7C:
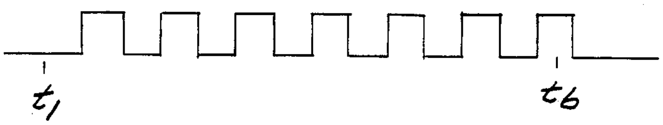
Figure 7D:
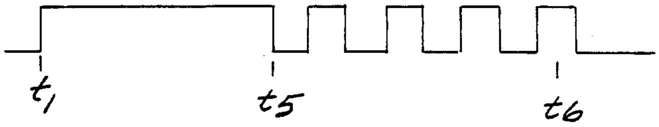
Figure 7E:
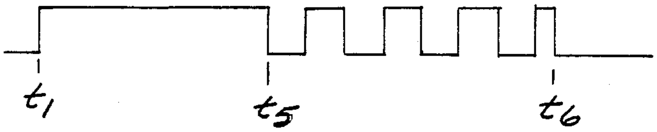

Modulator 102 comprises one-shot 130, oscillator 132, OR gate 134 and AND gate 136. When the enable signal on line 104 goes high, one-shot 130 produces a single pulse of predetermined duration on line 138, the signal on line 138 being illustrated in FIG. 7B as extending from time $t_1$ to time $t_5$. When the enable signal goes high, oscillator 132 is also activated, and provides a series of pulses on line 140 as illustrated in FIG. 7C. The pulses continue until the enable signal terminates at time $t_6$. The signals on lines 138 and 140 are ORed by OR gate 134 to produce a signal on line 142 that is illustrated in FIG. 7D. Finally, the enable signal and the signal on line 142 are ANDed by AND gate 136 to produce the strobe signal on line 56, as shown in FIG. 7E. The enable signal is essentially identical to the signal shown in FIG. 7D, except that AND gate 136 ensures that the signal terminates at time $t_6$ regardless of the state or phase of oscillator 132. It will therefore be apparent that the time interval $t_1$ to $t_5$, during which the print element is provided energy at a first, higher rate, is determined by the time constant of one shot 130. The second, lower rate at which energy is provided between times $t_5$ and $t_6$ is determined by the duty cycle of the signal on line 140, and therefore by oscillator 132. The energizing time interval $t_1$ through $t_6$ is determined by print enable circuit 100. Referring to FIG. 5, it is apparent that this energizing interval is greater than the time interval $t_1$ through $t_2$ of the strobe signal used in the prior art technique. Comparing the enable signal on line 104 (FIG. 6) to the prior art strobe signal 78, the extra duration can conveniently be accomplished by decreasing the current I1 produced by current source 106, by increasing the size of capacitor C1, or by any other suitable means that will be readily apparent to those skilled in the art. The degree of modification of print enable circuit 100 for a particular thermal printer is best determined empiricaly by judging the print quality at various settings.

While the preferred embodiments of the invention have been illustrated and described, it should be understood that variations will be apparent to those skilled in the art. Accordingly, the invention is not to be limited to the specific embodiments illustrated and described, and the true scope and spirit of the invention are to be determined by reference to the following claims.

The embodiments of the invention in which an exclusive property or privilege is claimed are defined as follows:

1. A thermal printing apparatus for printing on a thermal print medium having a conversion temperature to which the thermal print medium must be raised to cause printing to occur, the thermal printing apparatus operating in an alternating series of print cycles during which printing occurs and movement cycles during which the thermal print medium is moved with respect to the thermal printing apparatus, the thermal printing apparatus comprising:

a thermal print element; and exposure means for providing energy to the print element at a first average rate for a time sufficient to raise the temperature of the print element from below the conversion temperature to a temperature above the conversion temperature, and for then providing energy to the print element at a second average rate during the same print cycle, the second average rate being less than the first average rate but sufficient to maintain the temperature of the print element above the conversion temperature.

2. The apparatus of claim 1, wherein the exposure means comprises driver means operative to provide energy to the thermal print element in response to a strobe signal, and control means for generating the strobe signal, the strobe signal including a first portion adapted to cause the driver means to provide energy to the thermal print element at the first average rate and a second portion adapted to cause the driver means to provide energy to the thermal print element at the second average rate.

3. The apparatus of claim 2, wherein the strobe signal comprises a first pulse having a first pulse length sufficient to raise the temperature of the print element above the conversion temperature, followed by a series of second pulses, each second pulse having a second pulse length less than the first pulse length, the series of second pulses having a duty cycle selected to maintain the temperature of the print element above the conversion temperature.

4. The apparatus of claim 3, wherein the control means comprises print enable means for generating an enable signal having a characteristic that is operative to define an energizing interval during which energy may be provided to the print element, and modulation means for receiving the enable signal and for producing the strobe signal such that the first pulse terminates before the end of the energizing interval and such that the second pulses terminate at the end of the energizing interval.

5. A method for thermal printing on a thermal print medium having a conversion temperature to which the thermal print medium must be raised to cause printing to occur, the printing occurring during print cycles and the thermal print medium being moved with respect to the thermal printing apparatus during movement cycles, the print cycles and movement cycles alternating in occurance, the method comprising:

contacting the thermal print medium with a thermal element;

providing energy to the print element at a first average rate for a time sufficient to raise the temperature of the print element from below the conversion temperature to a temperature above the conversion temperature; and then providing energy to the print element at a second average rate during the same print cycle, the second average rate being less than the first average rate but sufficient to maintain the temperture of the print element above the conversion termperature.

6. The method of claim 5, wherein energy is provided to the print element at the first average rate at a constant rate, and wherein energy is provided to the print element at the second average rate by providing the energy as a series of pulses, the duty cycle of the pulses being selected to maintain the temperature of the print element above the conversion temperature.

* * * * *